(12) United States Patent
Valiveti et al.

(10) Patent No.: US 7,398,350 B1
(45) Date of Patent: Jul. 8, 2008

(54) DISTRIBUTION OF DATA VOLUME VIRTUALIZATION

(75) Inventors: Narasimha R. Valiveti, Sunnyvale, CA (US); Ronald S. Karr, Palo Alto, CA (US); Randall K. Shigai, San Jose, CA (US); Gopal Sharma, San Jose, CA (US)

(73) Assignee: Symantec Operating Corporation, Cupertino, CA (US)

( * ) Notice: Subject to any disclaimer, the term of this patent is extended or adjusted under 35 U.S.C. 154(b) by 211 days.

(21) Appl. No.: 10/696,622

(22) Filed: Oct. 29, 2003

(51) Int. Cl.
*G06F 12/00* (2006.01)

(52) U.S. Cl. .................. 711/111; 711/114; 711/156; 711/165

(58) Field of Classification Search .................. None
See application file for complete search history.

(56) References Cited

U.S. PATENT DOCUMENTS

| | | | | |
|---|---|---|---|---|
| 5,822,782 | A * | 10/1998 | Humlicek et al. | 711/170 |
| 6,304,942 | B1 * | 10/2001 | DeKoning | 711/114 |
| 6,505,216 | B1 * | 1/2003 | Schutzman et al. | 707/204 |
| 6,708,232 | B2 * | 3/2004 | Obara | 710/11 |
| 6,754,792 | B2 * | 6/2004 | Nakamura et al. | 711/162 |
| 6,779,093 | B1 * | 8/2004 | Gupta | 711/162 |
| 2004/0123029 | A1 * | 6/2004 | Dalal et al. | 711/114 |
| 2004/0123030 | A1 * | 6/2004 | Dalal et al. | 711/114 |
| 2004/0123062 | A1 * | 6/2004 | Dalal et al. | 711/170 |
| 2004/0123063 | A1 * | 6/2004 | Dalal et al. | 711/170 |
| 2004/0148443 | A1 * | 7/2004 | Achiwa | 710/36 |
| 2004/0153719 | A1 * | 8/2004 | Achiwa et al. | 714/5 |
| 2005/0050115 | A1 * | 3/2005 | Kekre | 707/204 |

OTHER PUBLICATIONS

Structured Computer Organization, 2nd ed., Tanenbaum, p. 11, Prentice Hall, INc., 1984.*

* cited by examiner

*Primary Examiner*—Reginald Bragdon
*Assistant Examiner*—Horace L. Flournoy
(74) *Attorney, Agent, or Firm*—Campbell Stephenson LLP

(57) ABSTRACT

After a first device (e.g., a host node in a shared data clustered system that stores a two-way mirrored volume) in a network creates or modifies a description of a layout for a data volume, the first device transmits separate copies of the data volume layout description to a pair of second devices, respectively, for storage in respective memories thereof. The first device may be a host node, and the pair of second devices may be first and second data storage systems. The first device and the pair of second devices are configured so that I/O transactions are transmitted between the first device and either of the pair of second devices. In other words, the first device is contained in a network layer that is different from the network layer that contains the pair of second devices.

20 Claims, 2 Drawing Sheets

DISTRIBUTION OF DATA VOLUME VIRTUALIZATION

BACKGROUND OF THE INVENTION

Many business organizations and governmental entities seek fast and inexpensive access to large amounts of data stored in storage area networks. FIG. 1 illustrates relevant components of an exemplary data system 10 for storing data. Data system 10 consists of a host node 12 coupled to a storage area network (SAN). The SAN consists of data storage systems 14 and 16 and SAN switch 18.

Host node 12 takes form in a computer system (e.g., a server) having one or more processors and a memory for storing data or instructions. Host node 12 executes an operating system and a volume manager. Volume managers, such as Volume Manager™ provided by VERITAS Software Corporation of Mountain View, Calif., are systems for organizing and managing the distribution of data of a volume across one or more storage devices. Volume and disk management products from other product software companies also provide a system for organizing and managing the distribution of volume data across multiple storage devices.

Host node 12 may be coupled to one or more client computer systems (not shown). Host node 12 generates input/output (I/O) transactions for reading data from or writing data to the data volume contained in data storage systems 14 and 16. These I/O transactions are transmitted to data storage systems 14 and 16 via SAN switch 18.

Each of the data storage systems 14 and 16 includes a plurality of storage devices such as hard disks (not shown). For example, data storage system 14 includes three hard disks designated $A_1$-$A_3$, while data storage system 16 includes three hard disks designated $B_1$-$B_3$. Each of the data storage systems 14 and 16 also include one or more processors for processing I/O transactions received from host node 12 as will be more fully described below.

As noted above, host node 12 executes a volume manager. The volume manager organizes the hard disks and storage objects (e.g., subdisks, extents, plexes, etc.) created from the hard disks to form a data volume. In organizing these hard disks, the volume manager creates a description of how the data volume is organized or laid out. There are many different ways to organize a data volume from underlying hard disks and storage objects. The layout description relates the storage objects to each other or to the hard disks of the data storage systems.

Properties of the storage depend on how the volume manager organizes the data volume. In theory, there are a large number of ways to organize the data volume. Popular storage types include spanning storage (using storage from several devices to make a larger volume), striped storage (interleaving block ranges between devices to increase performance), and mirrored storage (storing extra copies of the data to improve reliability). Data system 10 will be described with host node 12 aggregating the hard disks and storage objects of data storage systems 14 and 16 to form mirrored volume storage.

A mirrored volume replicates data over two or more plexes of the same size. For purposes of explanation, host node 12 aggregates hard disks and storage objects to form a two-way mirrored volume. In this two-way mirror, a logical block number i of a volume maps to the same block number i on each mirrored plex. A two-way mirrored volume corresponds to RAID 1.

FIG. 2 illustrates an exemplary volume layout description for the exemplary two-way mirrored volume stored within systems 14 and 16 of FIG. 1. More particularly, FIG. 2 consists of two plexes (i.e., plex 1 and plex 2). Plex 1 consists of three subdisks designated subdisk 1-subdisk 3, while plex 2 consists of three subdisks designated subdisk 4-subdisk 6. FIG. 2 also shows that subdisk 1-subdisk 3 are allocated from contiguous regions of hard disks $A_1$-$A_3$, respectively, while subdisks 4-subdisk 6 are allocated from contiguous regions of hard disks $B_1$-$B_3$, respectively. The layout description illustrated in FIG. 2, is stored within memory of host node 12. It is noted that the volume manager can modify the layout description as the volume manager modifies the organization of the data volume. For example, the volume manager may create new, change existing, or destroys storage objects of the volume.

Host node 12 uses volume layout description for many purposes. For example, host node uses the volume layout description illustrated in FIG. 2 when writing data to or reading data from the data volume. To illustrate, when host node 12 seeks to write data D to block x of the mirrored data volume example, host node 12 accesses the volume layout description shown in FIG. 2 to determine the location of the plexes to be updated with data D. In the illustrated example, the volume layout description indicates that data D is to be written to plex 1 and plex 2 aggregated from hard disks located in data storage systems 14 and 16, respectively.

Because the plexes are located in different data storage systems, host node 12 must generate and transmit separate I/O transactions to write data D to the data volume. More particularly, host node 12 generates first and second I/O transactions for writing data D to block x in plex 1 and plex 2, respectively. The first and second I/O transactions are sent to data storage systems 14 and 16, respectively. Data storage systems 14 and 16 process the first and second I/O transactions, respectively, and write data D to respective hard disks. A high frequency of I/O transactions transmitted between host node 12 and data storage systems 14 and 16 may burden the data system 10.

SUMMARY OF THE INVENTION

After a first device in a network creates or modifies a description of a layout for a data volume, the first device transmits separate copies of the data volume layout description to a pair of second devices, respectively, for storage in respective memories thereof. The first device may be a host node, and the pair of second devices may be first and second data storage systems. The first device and the pair of second devices are configured so that I/O transactions are transmitted between the first device and either of the pair of second devices. In other words, the first device is contained in a network layer that is different from the network layer that contains the pair of second devices.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
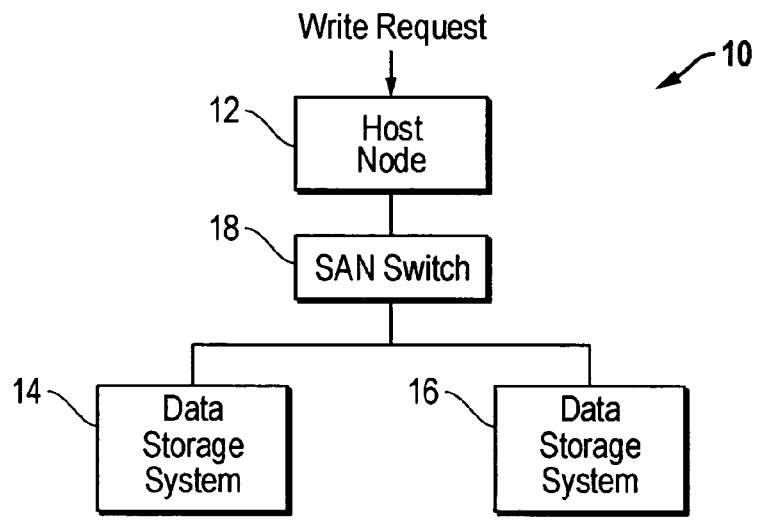
FIG. 1 is a block diagram of a data system.
Figure 2:
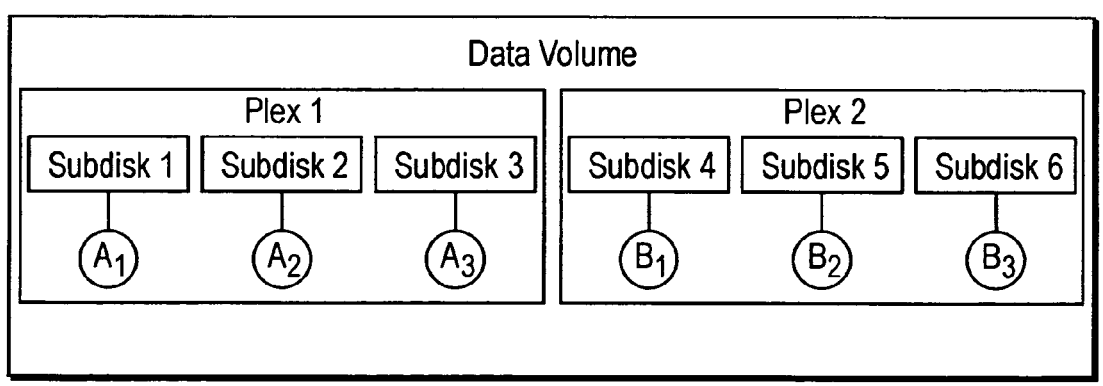
FIG. 2 illustrates an exemplary volume layout description employed in the data system of FIG. 1.
Figure 3:
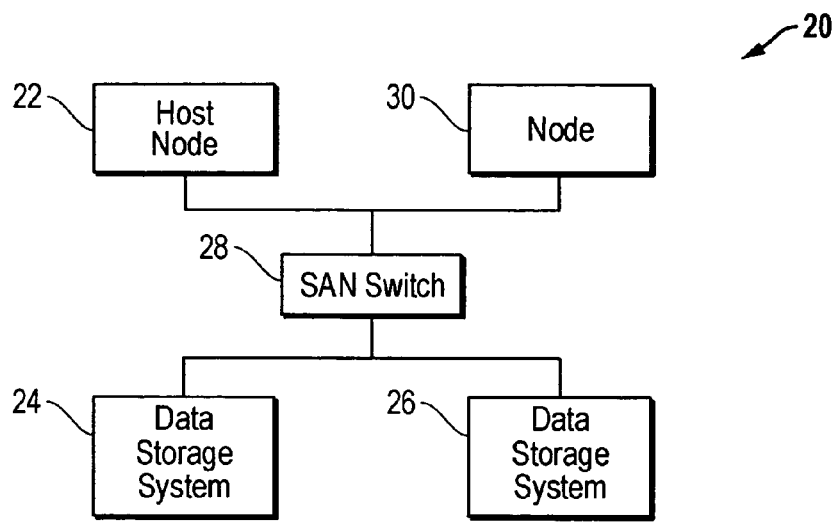
FIG. 3, is a block diagram of a data system employing one embodiment of the present invention.

FIG. 3 illustrates an exemplary data system 20 in which one embodiment of the present invention may be employed. The data system includes a first device 22 coupled to a pair of second devices 24 and 26 via a third device 28. The pair of second devices 24 and 26 are contained in a layer that is different than the layer that contains the first device 22 or the layer that contains the third device 28. I/O transactions are transmitted between devices in different layers of the data system 20 Thus, I/O transactions are transmitted between the first device 22 and device 24 via the third device 28, and I/O transactions are transmitted between the first device 22 and device 26 via device 28. For purposes of explanation, first device 22 takes form in a host node, the pair of second devices 24 and 26 take form in data storage systems while the third device 28 takes form in a SAN switch. The present invention will be described with reference to data system 20 containing a host node 22, a SAN switch 28, and two data storage systems 24 and 26, it being understood that the present invention should not be limited thereto. For example, the present invention could be used in a system in which Fiber Channel connected, IP-connected, and/or Infiniband-connected storage is used. Also, the term coupled should not be limited to a direct connection between two devices. Rather, the term coupled includes an indirect connection between two devices (e.g., host node 22 and data storage system 24) via a third device (i.e., SAN switch 28) so that the two devices can communicate via the third device.

Host node 22 may take form in a computer system (e.g., a server) having one or more processors and memory for storing data or computer executable instructions. Host node 22 may execute an operating system and a volume manager. It is noted that the volume manager may execute on a device other than host node 22. As will be more fully described below, the volume manager or another unit within host node 22, generates a description of the layout of the data volume distributed across devices 24 and 26. However, it should be noted that generation of the data volume description layout need not be generated at host node 22. Rather, the data volume layout description could be generated at a device such as node 30 coupled to host node 22. Moreover, the volume layout description could be generated in one or the storage systems 24 or 26, or in SAN switch 28. The device that generates the volume layout description distributes copies to one or more devices in system 20. For example, if the volume layout description is generated at node 30, node 30 could provide a volume layout description copy to host node 22 (or another node which is in the same layer as host node 22) and one or more devices in separate layers, e.g., copies provided data storage systems 24 and 26, or a copy provided to just SAN switch 28. The remaining description will presume that the data volume description layout is generated at the host node 22, and that host node 22 distributes copies of the volume layout description to one or more other devices in system 20, it being understood that the present invention should not be limited thereto.

Host node 22 generates I/O transactions to read data from or write data to the data volume stored in data system 20. For purposes of explanation, data system 20 will be described as storing just one two-way mirrored data volume, it being understood the present invention can be employed with data system 20 storing several data volumes. Moreover, it should be noted that the present invention should not be limited to data system 20 storing a mirrored volume. The present invention may be employed in a data system 20 employing parity or other forms of calculated redundancy, striping, and aggregation, along with features such as snapshots, replication, and online reorganization.

Each of data storage systems 24 and 26 may take any one of many different forms. For example, data storage systems 24 and 26 may take form in intelligent disk arrays, block server appliances, or combinations thereof. Each of the data storage systems 24 and 26 may include a plurality of storage devices (not shown) for storing volume data. Each of these storage devices may take form in one or more dynamic or static random access memories, one or more magnetic or optical data storage disks, or combinations thereof. Data storage system 24 will be described as having three storage devices designated $HD_1$-$HD_3$, while data storage system 26 will be described as having three storage devices designated $HD_4$-$HD_6$. For purposes of explanation, storage devices $HD_1$-$HD_6$ take form in hard disks, it being understood that storage devices should not be limited thereto. The storage devices of storage systems 24 and 26 could take form in any hardware, software, or combination of hardware and software in which data may be persistently stored and accessed.

Data storage systems 24 and 26 may include one or more processors and memory for storing computer executable instructions. Data storage systems 24 and 26 are capable of processing I/O write transactions received from host node 22 as will be more fully described below. Data storage system 24 can write data to one or more hard disks $HD_1$-$HD_3$ in response to data storage system 24 receiving and processing an I/O write transaction, and data storage system 26 may write data to one or more hard disks $HD_4$-$HD_6$ in response to data storage system 26 receiving and processing an I/O write transaction.

As noted above, host node 22 executes a volume manager. The volume manager 22 organizes the hard disks and storage objects (e.g., subdisks, extents, plexes, etc.) created from the hard disks of system 20 to form a data volume. In organizing these hard disks and storage objects, the volume manager creates a description of how the data volume is organized or laid out. There are many different ways the volume manager can organize a data volume from underlying hard disks and storage objects. For purposes of explanation only, the volume manager organizes the hard disks and storage objects to form a two-way mirrored volume V.

Figure 4:
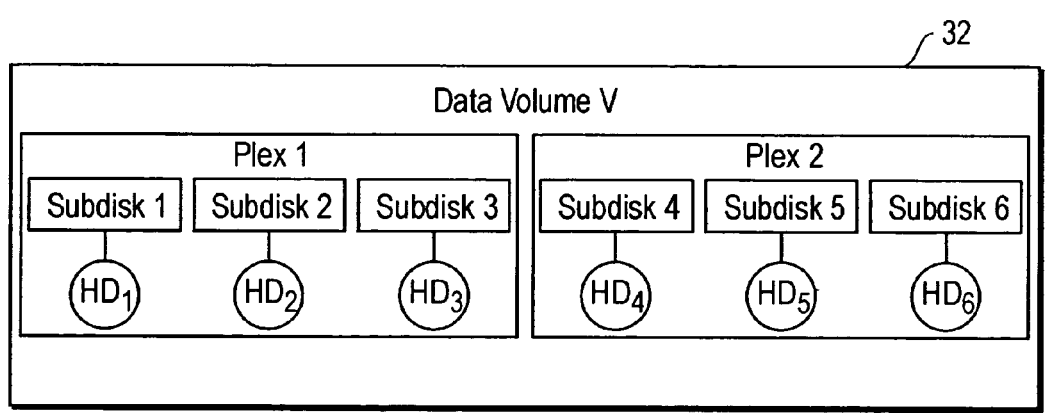
FIG. 4 illustrates an exemplary volume layout description employed in the data system of FIG. 3.

FIG. 4 illustrates an exemplary volume layout description created by the volume manager of host 22 for the two-way mirrored volume. The layout description of FIG. 4 consists of plex 1 and plex 2. A logical block number i of a volume V maps to the same block number i on each mirrored plex. Plex 1 consists of three subdisks designated subdisk 1-subdisk 3, while plex 2 consists of three subdisks designated subdisk 4-subdisk 6. It is noted that mirrored plexes need not contain the same number of subdisks. FIG. 4 also shows that subdisk 1-subdisk 3 is allocated from contiguous regions of hard disks $HD_1$-$HD_3$, respectively, while subdisks 4-subdisk 6 are allocated from contiguous regions of hard disks $HD_4$-$HD_6$, respectively.

After the volume layout description of FIG. 4 is first created, host node 22 can transmit a copy thereof to any one or more of the devices in system 20 including data storage system 24, data storage system 26, and/or SAN switch 28. In another embodiment, the copies of the volume layout description transmitted to the various devices in system 20 need not be identical to each other. Host node 22 could transmit copies of the volume layout description that are tailored to the operating characteristics of the devices that receive them.

The host node 22 may modify the volume layout description to account for changes in the corresponding volume. More particularly, the volume layout description is modified each time the volume manager of host node 22 creates new, changes existing, or destroys storage objects of volume V. It is important that distributed copies of the volume layout description are maintained consistent with each other. To achieve consistency when modifications are made to the volume layout description, host node 22 transmits copies of the modified volume layout description to each device (e.g., data storage systems 24 and 26) that received a prior copy. Alternatively, host node 22 transmits information that enables devices (e.g., data storage systems 24 and 26) to modify their copies of the volume layout description.

Once data storage systems 24 and 26 have a copy of volume layout description from host node 22, data storage systems 24 and 26 are capable of performing new operations. To illustrate, host node 22 may prepare and transmit an I/O transaction to write data D to, for example, data storage system 24. It is noted that in one embodiment, host node 22 may alternate between data storage system 24 and data storage system 26 as the destination for subsequent I/O write data transactions in an attempt to load balance the I/O write transactions within system 20. It should be made clear that there are many uses of the distributed volume layout description within a given system, and that the following description represents just one use. Further, the distributed volume layout description can be used for several distinct purposes within a system.

In response to receiving the I/O write transaction from host node 22, data storage system 24 accesses its local copy of volume layout description to identify the plexes where data D is to be written. In the illustrated example, data storage system 24 determines that data is to be written to each mirror (i.e., plex 1 and plex 2) of the mirrored volume V. Data storage system 24 recognizes from volume layout description that plex 1 is an aggregation of subdisks which have been allocated from the hard disks $HD_1$-$HD_3$ of data storage system 24, and that plex 2 is an aggregation of subdisks which have been allocated from the hard disks $HD_4$-$HD_6$ of data storage system 26.

Data storage system 24 writes data D to one or more of hard disks $HD_1$-$HD_3$ after accessing its copy of the most current volume layout description. Control information may cause data storage system 24 to forward the I/O transaction to data storage system 26 in response to determining from the volume layout description that plex 2 is contained within data storage system 26. The I/O transaction may be forwarded to data storage system 26 with some modification. For example, the I/O transaction may be forwarded with an instruction that data storage system 26 should not send the I/O transaction back to data storage system 24. It is noted that in an embodiment where data of volume V is distributed over more than two data storage systems of data system 20, data storage system 24 may forward the write I/O transaction to all data storage systems (other than data storage system 24), or data storage system 24 may forward the I/O transaction in multicast fashion to only those data storage systems that contain plexes where data D is to be written according to the volume layout description. Each data storage system that receives the I/O transaction could access its copy of the volume layout description to determine whether data D is to be written to one or more of its storage devices.

Data storage system 26, in response to receiving the I/O transaction from data storage system 24, may access its local copy of volume layout description and determine that data D is to be written to plex 1 and plex 2. Since data storage system 26 recognizes that it stores plex 2, data storage system 26 writes data D to one or more of hard disks $HD_4$-$HD_6$. After data storage 26 writes data D, data storage system 26 optionally transmits a message to data storage system 24 indicating that plex 2 has been updated with data D. Data storage system 24, in turn, may optionally transmit a message to host node 22 indicating that plex 1 and/or plex 2 have been updated with the new data D in response to receiving the update message from data storage system 26.

As noted above, distributed copies of the data volume layout description should be consistent with each other. In one of the examples, when host node 22 modifies its copy of the data volume layout description, copies of the modified volume layout description are provided to each device that received a prior version of the volume layout description. Each device subsequently updates its copy of the volume layout description. It may be necessary to delay, for example, host node 22's transmission of new I/O transactions until all devices update their copies of the volume layout description and consistency is again obtained between the distributed volume layout descriptions. The delay in transmission of new I/O transactions may begin with the first phase of a two phase commit. The first phase pauses I/O processing at the host node 22, and the second phase unblocks I/O processing at the host node 22 when modifications to the distributed copies of the volume layout description have been committed. In this fashion, data coherency is maintained in the data volume before and after modification of the volume layout description.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method comprising:
    a computing node in a network creating a data volume layout description of a data volume, wherein the data volume is composed from two or more data storage devices on the network;
    first, second and third devices each storing a respective copy of the data volume layout description or respective modified versions thereof in respective memories of the first, second and third devices, wherein the first device is located in a different network layer than the second and third devices;
    transmitting data input/output (I/O) transactions between the first device and the second device;
    transmitting data I/O transactions between the first device and the third device.

2. The method of claim 1 wherein the data volume layout description relates virtual storage objects of the data volume to other virtual storage objects of the data volume.

3. The method of claim 1 wherein the data volume layout description relates virtual storage objects of the data volume to one or more data storage systems of the network.

4. The method of claim 1 wherein the first device comprises a host node, wherein the second device comprises a first data storage system that stores a first portion of data of the data volume, and wherein the third device comprises a second data storage system that stores a second portion of data of the data volume.

5. The method of claim 4 further comprising:
    the host node generating a write I/O transaction to write new data, wherein the write I/O transaction comprises the new data;

the host node transmitting the write I/O transaction to only the first data storage system;

after receiving the write I/O transaction, the first data storage system generating another transaction to write the new data;

the first data storage system transmitting the other transaction to the second data storage system.

6. The method of claim 5 further comprising the first data storage system accessing the data volume layout description or the modified version thereof stored in memory of the first data storage system in response to receiving the write I/O transaction.

7. The method of claim 6 further comprising the second data storage system accessing the data volume layout description or the modified version thereof stored in memory of the second data storage system in response to receiving the other transaction.

8. The method of claim 4 further comprising:

the host node generating a write I/O transaction to write new data, wherein the write I/O transaction comprises the new data;

the host node transmitting the write I/O transaction to the first data storage system;

after receiving the write I/O data transaction, the first data storage system accessing the data volume layout description or the modified version thereof stored in memory of the first data storage system;

after accessing the data volume layout description or the modified version thereof stored in memory of the first data storage system, the first data storage system writing all the new data to separate memory locations within the first data storage system.

9. The method of claim 1 wherein the computing node is contained within the first, second, or third device.

10. The method of claim 1 wherein the first device comprises a host node, wherein second device comprises a data storage system that stores a portion of data of the data volume, and wherein the third device comprises a switch coupled between the host node and the data storage system.

11. The method of claim 1 further comprising:

the computing node modifying the data volume layout description;

the first, second and third devices overwriting their respective data volume layout descriptions or their respective modified versions of the data volume layout descriptions with a copy of the modified data volume layout description or respective modified versions thereof.

12. A computer readable medium storing computer executable instructions, wherein a method is performed by a first device within a network in response to the first device executing the computer executable instructions, the method comprising:

the first device transmitting a first copy of a data volume layout description of a data volume or a modified first copy of the data volume layout description to a second device in the network, wherein data of the data volume is stored in two or more data storage systems of the network;

the first device transmitting a second copy of the data volume layout description or a modified second copy of the data volume layout description to a third device in the network;

the first device transmitting input/output (I/O) transactions to the second and third devices, wherein the first device is located in a different network layer than the second and third devices.

13. The computer readable medium of claim 12 wherein the data volume layout description relates virtual storage objects of the data volume to other virtual storage objects of the data volume.

14. The computer readable medium of claim 12 wherein the data volume layout description relates virtual storage objects of the data volume to one or more data storage systems of the network.

15. The computer readable medium of claim 12 wherein the first device comprises a host node, wherein the second device comprises a first data storage system that stores a first portion of data of the data volume, and wherein the third device comprises a second data storage system that stores a second portion of data of the data volume.

16. The computer readable medium of claim 15 wherein the method further comprises:

the host node generating a write I/O transaction to write new data, wherein the write I/O transaction comprises the new data;

the host node transmitting the write I/O transaction to only the first data storage system.

17. The computer readable medium of claim 12 wherein the method further comprises:

the first device modifying the data volume layout description to create a modified data volume layout description;

the first device transmitting a copy of the modified data volume layout description or a modified version thereof to the second device.

18. A computer readable medium storing instructions, wherein the instructions are executable by a processor in a second device in a network containing a first device, the second device, and a third device, wherein the network stores a data volume, wherein the first device is configured to transmit I/O transactions to the second device, and wherein the first device is configured to transmit I/O transactions to the third device, the method comprising:

the second device receiving and storing in memory thereof, a data volume layout description of the data volume created and transmitted by the first data device;

the second device receiving an write I/O transaction from the first device, wherein the write I/O transaction comprises data D;

after receiving the write I/O transaction, the second device generating another transaction to write data D;

the second device transmitting the other transaction to the third device.

19. A computer readable medium storing instructions, wherein the instructions are executable by a processor in a second device in a network containing a first device, the second device, and a third device, wherein the network stores a data volume, wherein the first device is configured to transmit I/O transactions to the second device, wherein the first device is configured to transmit I/O transactions to the third device, and wherein the first device is located in a different network layer than the second and third devices, the method comprising:

the second device receiving and storing in memory thereof, a data volume layout description of the data volume created and transmitted by the first data device;

the second device receiving an write I/O transaction from the first device, wherein the write I/O transaction comprises data D in response to receiving the write I/O data transaction, the first second device accessing the data volume layout description or the modified version thereof stored in memory of the first device;

in response to accessing the data volume layout description or the modified version thereof stored in memory of the second device, the second device writing data D to separate memory locations within the second device.

20. A network comprising:

a first device coupled to second and third devices, wherein the first device is configured to transmit I/O data transactions to the second and third devices, and wherein the first device is located in a different network layer than the second and third devices;

wherein the first device is configured to create a data volume layout description of a data volume, wherein data of the data volume is stored in two or more data storage systems of the network;

wherein the first device is configured to store the data volume layout description in memory of the first device;

wherein the second and third devices are configured to store a copy of the data volume layout description or respective modified versions thereof in respective memories of the second and third devices.

* * * * *

UNITED STATES PATENT AND TRADEMARK OFFICE
CERTIFICATE OF CORRECTION

PATENT NO.        : 7,398,350 B1
APPLICATION NO.   : 10/696622
DATED             : July 8, 2008
INVENTOR(S)       : Valiveti et al.

It is certified that error appears in the above-identified patent and that said Letters Patent is hereby corrected as shown below:

On the cover of the patent at (75) please correct the spelling of the second listed inventor's name to read: Randall K. Shingai.

Signed and Sealed this

Seventh Day of July, 2009

JOHN DOLL
*Acting Director of the United States Patent and Trademark Office*